United States Patent
Yokota (10) Patent No.: US 7,444,153 B2
(45) Date of Patent: Oct. 28, 2008

(54) COMMUNICATION APPARATUS CONTROLLER, COMMUNICATION APPARATUS AND COMMUNICATION SYSTEM

(75) Inventor: Tomoyoshi Yokota, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 188 days.

(21) Appl. No.: 10/927,249

(22) Filed: Aug. 26, 2004

(65) Prior Publication Data

US 2005/0094608 A1    May 5, 2005

(30) Foreign Application Priority Data

Aug. 28, 2003    (JP)    ............... P.2003-305528

(51) Int. Cl.
| | |
|---|---|
| H04Q 7/20 | (2006.01) |
| H04B 1/60 | (2006.01) |
| H04B 17/02 | (2006.01) |
| H04B 7/185 | (2006.01) |
| H04L 12/28 | (2006.01) |

(52) U.S. Cl. ............... 455/445; 455/9; 455/13.1; 455/439; 455/435.1; 370/351

(58) Field of Classification Search .............. 455/445, 455/435.1, 439, 9, 13.1; 370/351
See application file for complete search history.

(56) References Cited

U.S. PATENT DOCUMENTS

| | | | | |
|---|---|---|---|---|
| 5,267,261 | A | * | 11/1993 | Blakeney et al. ............ 370/332 |
| 5,850,593 | A | * | 12/1998 | Uratani ..................... 455/11.1 |
| 5,915,221 | A | * | 6/1999 | Sawyer et al. .............. 455/437 |
| 6,243,575 | B1 | * | 6/2001 | Ohyama et al. ........... 455/456.4 |
| 6,304,556 | B1 | * | 10/2001 | Haas ........................ 370/254 |
| 2002/0012385 | A1 | * | 1/2002 | Yun et al. .................. 375/146 |
| 2002/0196755 | A1 | * | 12/2002 | Hidaka et al. ............. 370/335 |
| 2003/0026229 | A1 | * | 2/2003 | Larson et al. .............. 370/338 |
| 2003/0058921 | A1 | * | 3/2003 | Leeper ..................... 375/132 |
| 2003/0092443 | A1 | * | 5/2003 | Hiyama et al. ............. 455/435 |

FOREIGN PATENT DOCUMENTS

| | | |
|---|---|---|
| JP | 10155172 A | 6/1998 |
| JP | 10164640 A | 6/1998 |
| JP | 2001138916 A | 5/2001 |
| JP | 2002217825 A | 8/2002 |
| JP | 2002-300644 | 10/2002 |
| JP | 2002335573 A | 11/2002 |
| JP | 2003101465 A | 4/2003 |

OTHER PUBLICATIONS

Japanese language office action and its English language translation for corresponding Japanese application No. 2003305528 lists the references above.

* cited by examiner

*Primary Examiner*—Vincent P. Harper
*Assistant Examiner*—Ariel Balaoing
(74) *Attorney, Agent, or Firm*—Hogan & Hartson LLP (57) ABSTRACT

An EV-DO terminal module is made up of hardware and software for implementing the function as an EV-DO terminal. A W-LAN terminal module is made up of hardware and software for implementing the function as an AP of W-LAN. An information exchange terminal module has a function equal to that of the W-LAN terminal module. A control module has a dialup function and a function based on PPP protocol and is a hardware and software module for controlling the EV-DO terminal module, the information exchange terminal module, and the W-LAN terminal module.

2 Claims, 8 Drawing Sheets

| COMMUNICATION APPARATUS ID | EV-DO BASE STATION ID | PN NO. | SINR (dB) | WITH OR WITHOUT COMMUNICATIONS | DOWNLINK THROUGHPUT (bps) | THE NUMBER OF OPERATING COMMUNICATION APPARATUS | PREDICTED DOWNLINK THROUGHPUT (bps) | PREDICTED DOWNLINK THROUGHPUT PER COMMUNICATION APPARATUS (bps) |
|---|---|---|---|---|---|---|---|---|
| 1 | A | 1 | $X_1$ | WITH | Y | 1 | Y | Y |
| | A | 2 | $X_2$ | WITHOUT | - | 0 | $Y_2$ | $Y_2$ |
| | A | 3 | $X_3$ | WITHOUT | - | 2 | $Y_3$ | $Y_3/3$ |
| | B | 1 | $X_4$ | WITHOUT | - | 0 | $Y_4$ | $Y_4$ |
| | B | 2 | $X_5$ | WITHOUT | - | 1 | $Y_5$ | $Y_5/2$ |
| | B | 3 | $X_6$ | WITHOUT | - | 0 | $Y_6$ | $Y_6$ |
| | C | 1 | $X_7$ | WITHOUT | - | 1 | $Y_7$ | $Y_7/2$ |
| | C | 2 | $X_8$ | WITHOUT | - | 0 | $Y_8$ | $Y_8$ |
| | C | 3 | $X_9$ | WITHOUT | - | 0 | $Y_9$ | $Y_9$ |
| 2 | A | 1 | $Z_1$ | WITHOUT | - | 1 | $R_1$ | $R_1/2$ |
| | A | 2 | $Z_2$ | WITHOUT | - | 0 | $R_2$ | $R_2$ |
| | A | 3 | $Z_3$ | WITH | R | 2 | R | R |
| | B | 1 | $Z_4$ | WITHOUT | - | 0 | $R_4$ | $R_4$ |
| | B | 2 | $Z_5$ | WITHOUT | - | 1 | $R_5$ | $R_5/2$ |
| | B | 3 | $Z_6$ | WITHOUT | - | 0 | $R_6$ | $R_6$ |
| | C | 1 | $Z_7$ | WITHOUT | - | 1 | $R_7$ | $R_7/2$ |
| | C | 2 | $Z_8$ | WITHOUT | - | 0 | $R_8$ | $R_8$ |
| | C | 3 | $Z_9$ | WITHOUT | - | 0 | $R_9$ | $R_9$ |
| i | A | 1 | $P_1$ | WITHOUT | - | 1 | $S_1$ | $S_1/2$ |
| | A | 2 | $P_2$ | WITHOUT | - | 0 | $S_2$ | $S_2$ |
| | A | 3 | $P_3$ | WITH | S | 2 | S | S |
| | C | 1 | $P_4$ | WITHOUT | - | 1 | $S_4$ | $S_4/2$ |
| | C | 2 | $P_5$ | WITHOUT | - | 0 | $S_5$ | $S_5$ |
| | C | 3 | $P_6$ | WITHOUT | - | 0 | $S_6$ | $S_6$ |
| | D | 1 | $P_7$ | WITHOUT | - | 0 | $S_7$ | $S_7/2$ |
| | D | 2 | $P_8$ | WITHOUT | - | 0 | $S_8$ | $S_8$ |
| | D | 3 | $P_9$ | WITHOUT | - | 0 | $S_9$ | $S_9$ |
| N | A | 1 | $Q_1$ | WITHOUT | - | 1 | $T_1$ | $T_1/2$ |
| | A | 2 | $Q_2$ | WITHOUT | - | 0 | $T_2$ | $T_2$ |
| | A | 3 | $Q_3$ | WITHOUT | - | 2 | $T_3$ | $T_3/3$ |
| | B | 1 | $Q_4$ | WITHOUT | - | 0 | $T_4$ | $T_4$ |
| | B | 2 | $Q_5$ | WITH | T | 1 | T | T |
| | B | 3 | $Q_6$ | WITHOUT | - | 0 | $T_6$ | $T_6$ |
| | D | 1 | $Q_7$ | WITHOUT | - | 0 | $T_7$ | $T_7$ |
| | D | 2 | $Q_8$ | WITHOUT | - | 0 | $T_8$ | $T_8$ |
| | D | 3 | $Q_9$ | WITHOUT | - | 0 | $T_9$ | $T_9$ |

| TYPE NO. | CONTENTS |
|---|---|
| 1 | EV-DO INFORMATION COLLECTION |
| 2 | EV-DO INFORMATION |
| 3 | HANDOFF INSTRUCTION |

COMMUNICATION APPARATUS CONTROLLER, COMMUNICATION APPARATUS AND COMMUNICATION SYSTEM

BACKGROUND OF THE INVENTION

1. Field of the Invention

The invention relates to a communication control apparatus that determines a base station to communicate with, and a communication apparatus and a communication system using the communication control apparatus.

2. Description of the Related Art

In recent years, cdma2000 1x - EV DO (hereafter referred to as "EV-DO") has been developed as a next-generation high-speed radio communication system. The EV-DO is a system of specializing cdma2000 1x provided by expanding cdma2000 to the third-generation system for data communications and increasing the transmission rate. Here, "EV" means Evolution and "DO" means Data Only.

In the EV-DO, the configuration of a radio interface of an uplink from a radio communication terminal to a base station is almost similar to that in the cdma2000 1x. The radio interface configuration of a downlink from a base station to a radio communication terminal is the same as that in the cdma2000 1x in the band width stipulated to 1.23 MHz. On the other hand, it differs largely from that in the cdma2000 1x in the modulation system, multiplexing method, etc. The modulation system used in the cdma2000 1x is QPSK, HPSK; in the EV-DO, the modulation system is switched to QPSK, 8-PSK, or 16 QAM in response to the reception state of the downlink in a radio communication terminal. Consequently, if the reception state is good, a high transmission rate with low error tolerance is used and if the reception state is bad, a low transmission rate with high error tolerance is used.

TDMA (Time Division Multiple Access) rather than CDMA (Code Division Multiple Access) used in cdmaOne and cdma2000 1x is used as the multiplexing method for simultaneously conducting communications from one base station to a plurality of radio communication terminals. In the TDMA, the time is divided in 1/600 second units and communications are conducted only with one radio communication terminal in one time unit and further the radio communication terminal is switched every unit time for conducting communications with a plurality of radio communication terminals.

The radio communication terminal measures the Carrier to Interference power Ratio (CIR) of a pilot signal as the reception state of the downlink from the base station. The radio communication terminal also predicts the reception state at the next reception timing from the fluctuation in the CIR and sends the "receivable maximum transmission rate at a predetermined error rate or less" expected based on the prediction result to the base station as a Data Rate Control bit (DRC). Here, the predetermined error rate depends on the system design and usually is about 1%. The base station receives the DRC from a plurality of radio communication terminals and determines which radio communication terminal the base station is to communicate with in each time unit. To communicate with each radio communication terminal, basically the base station uses the high transmission rate as much as possible based on the DRC from the radio communication terminal.

In the EV-DO, the transmission rate of a maximum of 2.4 Mbps per sector is possible on the downlink. However, the transmission rate is the total of the data communication amounts with a plurality of radio communication terminals to which one base station is connected in one frequency band in one of sectors usually provided; if a plurality of frequency bands are used, the transmission rate is also increased.

JP-A-2002-300644 is known as a related art.

When the user conducts communications in the EV-DO in a building or a railroad vehicle, the strength of the radio signal received by the radio communication terminal may be insufficient or distortion of the radio signal may grow. In this case, generally the EV-DO transmission rate becomes low. Under such circumstances, an example of a method for improving the EV-DO transmission rate is to install a communication apparatus compatible with the EV-DO in a vehicle. The communication apparatus can communicate with an EV-DO base station installed outside the vehicle. Further, the communication apparatus includes a function as a base station in a wireless LAN system (hereafter referred to as "W-LAN"). The communication apparatus including the function can communicate with a W-LAN terminal used by the user in a vehicle. That is, the user can use a W-LAN terminal in a vehicle for connecting to the communication apparatus. The communication apparatus connected with the W-LAN terminal transmits and receives data between an EV-DO base station and the W-LAN terminal. If an antenna of such a communication apparatus is installed in a place of the vehicle where a good propagation environment is provided, the EV-DO transmission rate is improved.

To select a base station to communicate with, the communication apparatus generally measures the quality of each of radio transmission lines with a plurality of base stations (hereafter referred to as "transmission line quality") and selects the base station with the best transmission line quality among them. If the base station selection method is applied to the case where the above-described communication apparatus is installed in each of vehicles, it is also possible that a plurality of communication apparatus may connect to a specific base station. In this case, the plurality of communication apparatus share the transmission band of the base station. Consequently, the transmission rate per communication apparatus is decreased.

SUMMARY OF THE INVENTION

The object of the invention is to provide a communication control apparatus capable of improving the transmission rate, and a communication apparatus and a communication system using the communication control apparatus.

The invention provides a communication control apparatus having: an information acquisition section that acquires, from a communication apparatus, information concerning base stations with which the communication apparatus can communicate; a determination section that determines a base station with which the communication apparatus should communicate based on the information acquired by the information acquisition section; and an instruction section that instructs the communication apparatus to communicate with the base station determined by the determination section.

Thus, the base station with which the communication apparatus should communicate is determined based on the information concerning the base stations with which the communication apparatus can communicate, acquired by the information acquisition section, and the determination result is sent to the communication apparatus. Therefore, the processing can be separated from the communication apparatus, and a burden on the communication apparatus can be lessened. Further, connection from a plurality of communication apparatus can also be prevented from concentrating on a specific base station.

The invention also provides a communication apparatus having: an information generation section that generates information concerning base stations with which the communication apparatus can communicate; an information exchange section that exchanges information concerning base stations with which another communication apparatus can communicate; a determination section that determines a base station with which the another communication apparatus should communicate based on the information concerning the base stations with which the another communication apparatus can communicate, acquired by the information exchange section from the another communication apparatus; and an instruction section that instructs the another communication apparatus to communicate with the base station determined by the determination section.

Thus, the communication apparatus not only determines the base station with which the communication apparatus should communicate, but also determines the base station with which the another communication apparatus should communicate based on the information concerning the base stations with the another communication apparatus can communicate, acquired from the another communication apparatus, and sends the determination result to the another communication apparatus. Therefore, the transmission rate of the different communication apparatus can be increased, and a burden on the another communication apparatus can be lessened.

The invention also provides a communication apparatus having: an information generation section that generates information concerning base stations with which the communication apparatus can communicate; an information exchange section that transmits the information generated by the information generation section to another communication apparatus, and receives an instruction of communications with a base station with which the communication apparatus should communicate, transmitted from the another communication apparatus; and a determination section that determines a base station with which the communication apparatus should communicate, based on the instruction received by the information exchange section.

Thus, the information concerning the base stations with which the communication apparatus can communicate is generated, and is transmitted to the another communication apparatus, and the base station with which the communication apparatus should communicate is determined based on the instruction transmitted from the another communication apparatus, so that the processing can be lessened.

The information generated by the information generation section may involve information concerning a communication speed predicted in a case that the communication apparatus communicates with the base stations with which the communication apparatus can communicate. If a communication speed with the base station with which the communication apparatus should communicate is smaller than a first threshold value, the determination section may determine that a base station with a predicted communication speed equal to or greater than a second threshold value is the base station with which the communication apparatus should communicate. The communication apparatus may have a relay section that relays between a user terminal and the base stations.

The invention also provides a communication system having: a slave communication apparatus that generates information concerning base stations with which the communication apparatus can communicate, and outputs the generated information; and a master communication apparatus that determines a base station with which the slave communication apparatus should communicate based on the information output from the slave communication apparatus, wherein the slave communication apparatus communicates with the base station determined by the master communication apparatus. In the communication system, the slave communication apparatus may communicate with the base station determined by the master communication apparatus.

Conversion of any desired combination of the components described above and the representation of the invention among methods, units, systems, record media, computer programs, etc., is also effective as an aspect of the invention.

Thus, there can be provided the communication control apparatus capable of improving the transmission rate, and the communication apparatus and the communication system using the communication control apparatus.

DETAILED DESCRIPTION OF THE PREFERRED EMBODIMENTS

In an embodiment of the invention, a communication apparatus installed in each railroad vehicle will be discussed. The communication apparatus of the embodiment has a function of communicating with each of an EV-DO base station installed outside the vehicle, a W-LAN terminal in the vehicle, and a communication apparatus installed in another vehicle, and realizes indirect communications between the W-LAN terminal used by the user and an EV-DO base station. One of the installed communication apparatus is set to the master communication apparatus and others are set to slave communication apparatus. Each slave communication apparatus generates EV-DO information concerning the communicating EV-DO base station and an EV-DO base station with which the slave communication apparatus can communicate, and transmits the EV-DO information to the master communication apparatus.

The master communication apparatus generates its own EV-DO information and also acquires the EV-DO information of other slave communication apparatus and collects them to generate an EV-DO information table. Further, the master communication apparatus determines the EV-DO base station with which each communication apparatus should communicate so that the EV-DO transmission rate in each communication apparatus becomes high based on the EV-DO information table. Each slave communication apparatus hands off to the EV-DO base station to communicate with, determined by the master communication apparatus. The master communication apparatus and the slave communication apparatus are connected by a wired or wireless communication line to transmit and receive the above-described EV-DO information, etc. Particularly, to use a wireless line, they can also be connected by W-LAN. However, to avoid confusion with W-LAN of a network between a communication apparatus and a W-LAN terminal, the above-mentioned communication line is called "information exchange line" or simply "information exchange."

Figure 1:
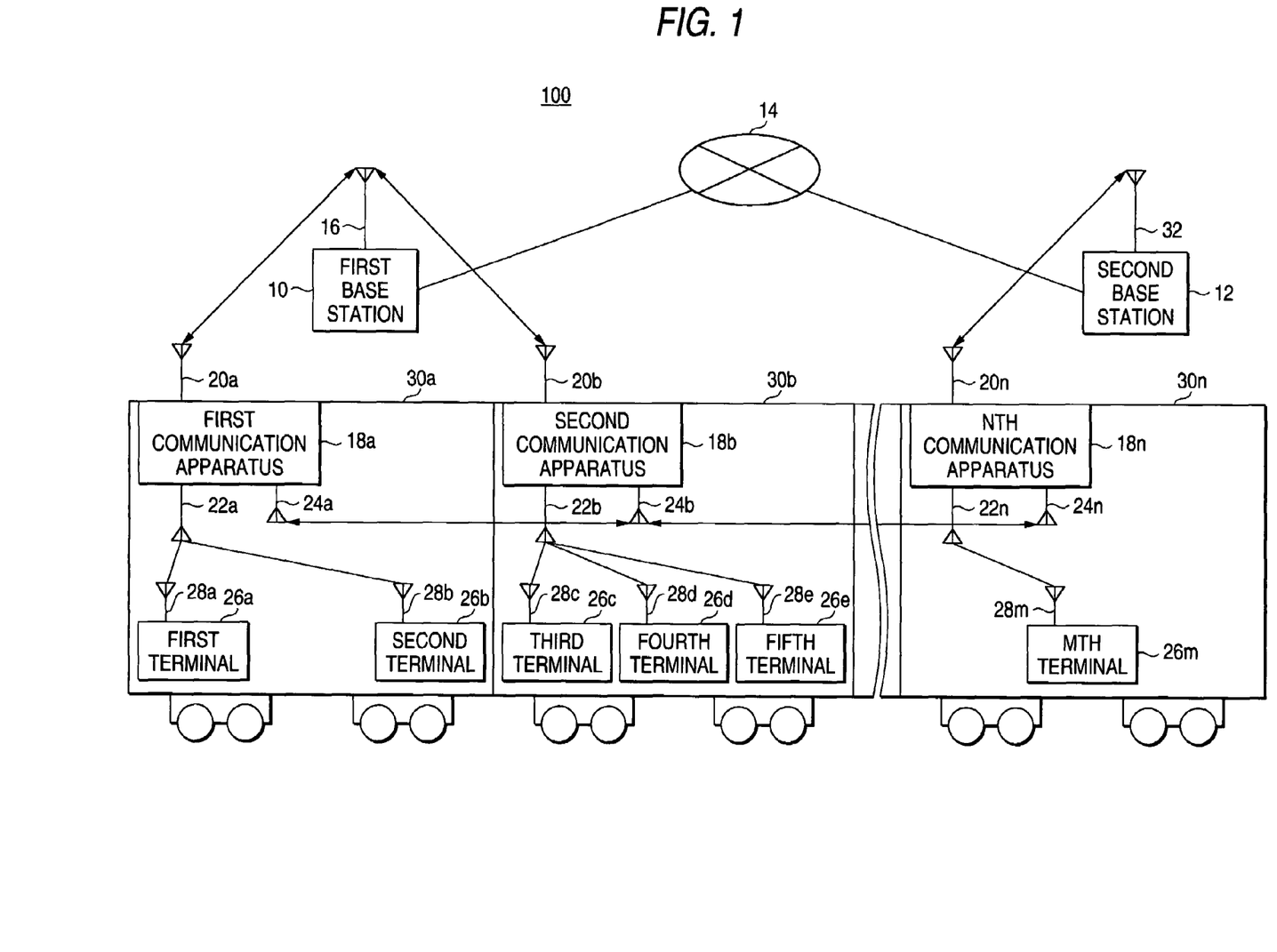
FIG. 1 is a diagram to show the configuration of a communication system of an embodiment of the invention.

FIG. 1 shows a communication system 100 of the embodiment. The communication system 100 is used in a first vehicle 30a, a second vehicle 30b, . . . an Nth vehicle 30n collectively called vehicle 30. The communication system 100 includes a first base station 10, a second base station 12, a network 14, a first communication apparatus 18a, a second communication apparatus 18b, . . . an Nth communication apparatus 18n collectively called communication apparatus 18, and a first terminal 26a, a second terminal 26b, a third terminal 26c, a fourth terminal 26d, a fifth terminal 26e, . . . an Mth terminal 26m collectively called terminal 26.

The first base station 10 includes a first base station antenna 16. The second base station 12 includes a second base station antenna 32. The communication apparatus 18 includes a first EV-DO antenna 20a, a second EV-DO antenna 20b, . . . an Nth EV-DO antenna 20n collectively called EV-DO antenna 20, a first W-LAN antenna 22a, a second W-LAN antenna 22b, . . . an Nth W-LAN antenna 22n collectively called W-LAN antenna 22, and a first information exchange antenna 24a, a second information exchange antenna 24b, . . . an nth information exchange antenna 24n collectively called information exchange antenna 24. The terminal 26 includes a first terminal antenna 28a, a second terminal antenna 28b, a third terminal antenna 28c, a fourth terminal antenna 28d, a fifth terminal antenna 28e, . . . an Mth terminal antenna 28m collectively called terminal antenna 28.

A plurality of vehicles 30 are connected, pick up users, and move crossing a service area formed by the first base station 10 or the second base station 12.

The terminal 26 is used by the user for communicating with the communication apparatus 18. The communication system of the terminal 26 is W-LAN and has the terminal antenna 28 covering the W-LAN frequency.

Both the first base station 10 and the second base station 12 are base stations compatible with the EV-DO and communicate with the communication apparatus 18. The first base station 10 and the second base station 12 can also access the network 14. The first base station 10 and the second base station 12 have the first base station antenna 16 and the second base station antenna 32 each being a three-sector antenna having 120-degree directivity, respectively. Each sector is assigned PN number. An example of the maximum transmission rate of W-LAN is 11 Mbps or 54 Mbps and the maximum transmission system of EV-DO is 24 Mbps. That is, the EV-DO is a low-speed communication system as compared with the W-LAN. Thus, the transmission rate of the vehicle 30 to the outside is lower than the transmission rate inside the vehicle 30. Hereinafter, the first base station 10 and the second base station 12 may be called simply "base station" or "EV-DO base station."

The communication apparatus 18 has the EV-DO antenna 20, the W-LAN antenna 22, and the information exchange antenna 24 and accordingly has the function of an EV-DO terminal, the function of a W-LAN base station, and the function required for information exchange. In the embodiment, assuming that a plurality of terminals 26 communicate with the first base station 10 or the second base station 12 via the communication apparatus 18 and the traffic becomes heavy, one communication apparatus 18 is installed in one vehicle 30. A plurality of communication apparatus 18 are connected to each other wiredly or by radio and are connected by W-LAN through the information exchange antennas 24. One of the communication apparatus 18 is set to the master communication apparatus and other communication apparatus 18 are set to slave communication apparatus. In the description that follows, for simplicity, they are represented as master communication apparatus and slave communication apparatus and the correspondence between them and the first communication apparatus 18, etc., is not described. The operation of the master communication apparatus and the slave communication apparatus is described later. The communication apparatus 18 in FIG. 1 are connected separately to the first base station 10 or the second base station 12.

Figure 2:
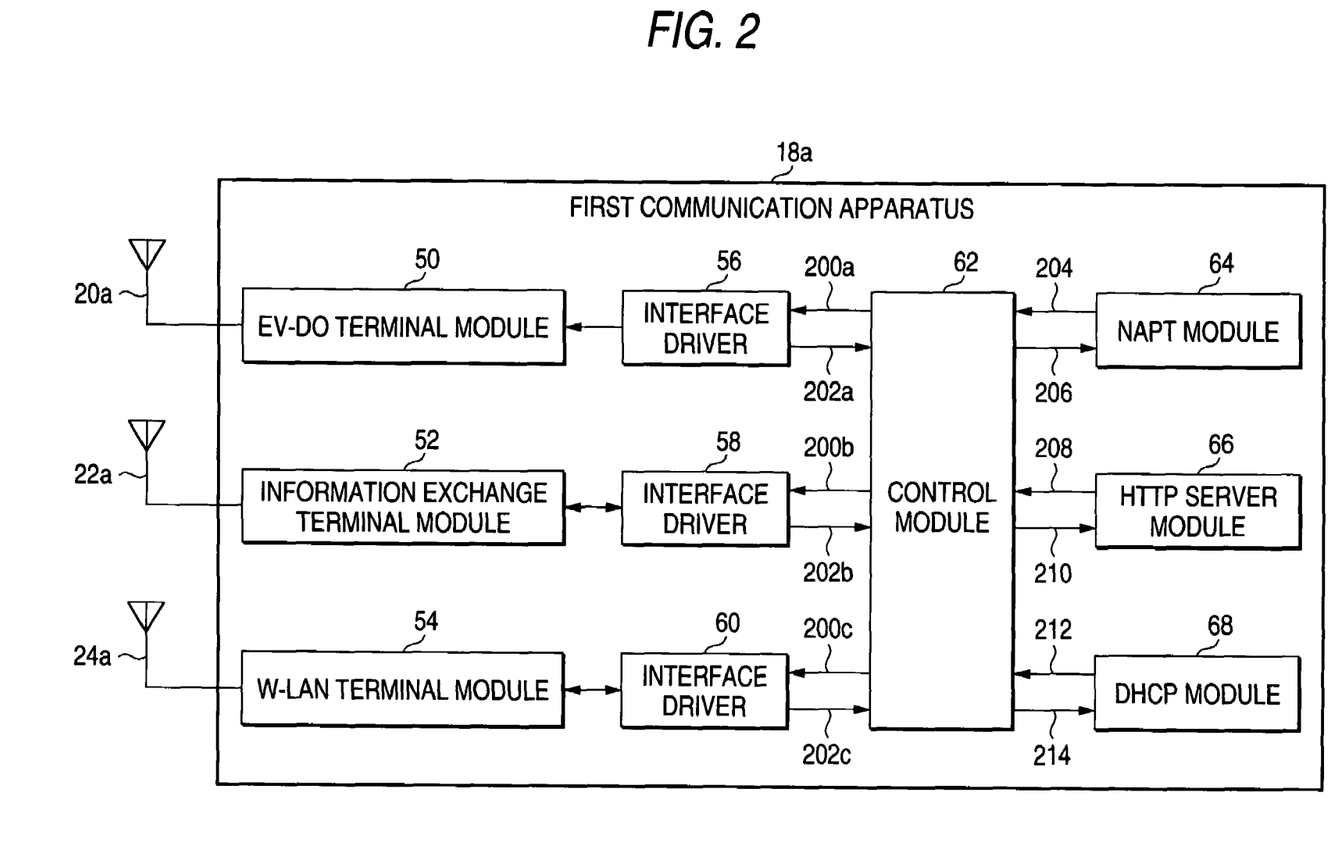
FIG. 2 is a block diagram to show the configuration of a first communication apparatus.

FIG. 2 shows the configuration of the first communication apparatus 18a. The first communication apparatus 18a includes an EV-DO terminal module 50, an information exchange terminal module 52, a W-LAN terminal module 54, a first I/F driver 56, a second I/F driver 58, a third I/F driver 60, a control module 62, an NAPT module 64, an HTTP server module 66, and a DHCP module 68. The first communication apparatus 18a also includes signal lines of a first module output line 200a, a second module output line 200b, and a third module output line 200c collectively called module output line 200, a first module input line 202a, a second module input line 202b, and a third module input line 202c collectively called module input line 202, an NAPT input line 204, an NAPT output line 206, an HTTP input line 208, an HTTP output line 210, a DHCP input line 212, and a DHCP output line 214.

The EV-DO terminal module 50 is made up of hardware and software for implementing the function as an EV-DO terminal. The first I/F driver 56 is a driver of an interface for connecting the EV-DO terminal module 50 and the control module 62 and is made up of hardware and software. For example, USB, PCMCIA, etc., is available as the interface. To transmit a signal to the control module 62, the first I/F driver 56 has the first module output line 200a and the first module input line 202a.

The W-LAN terminal module 54 is made up of hardware and software for implementing the function as an AP (Access Point) of W-LAN. The third I/F driver 60 is a driver of an interface for connecting the W-LAN terminal module 54 and the control module 62 and is made up of hardware and software. In the software, a header is added and deleted. To transmit a signal to the control module 62, the third I/F driver 60 has the third module output line 200c and the third module input line 202c.

The information exchange terminal module 52 and the second I/F driver 58 have functions equal to those of the W-LAN terminal module 54 and the third I/F driver 60. To decrease interference between the information exchange line and the W-LAN, the radio frequency is set to a different value from the value of the radio frequency of the W-LAN terminal module 54 or different standards such as IEEE802.11a, IEEE802.11b, and IEEE802.11g are used. To transmit a signal to the control module 62, the second I/F driver 58 has the second module output line 200b and the second module input line 202b.

The NAPT module 64 is a software module having both NAT and IP masquerade functions and is a module for performing address conversion and correspondence management between the local IP address assigned to the terminal 26 and the global IP address assigned from the first base station 10, the second base station 12, or the network 14. To transmit a signal to the control module 62, the NAPT module 64 has the NAPT input line 204 and the NAPT output line 206.

The HTTP server module 66 is a software module having an HTTP server function for downloading content from the Internet and distributing it to the terminal 26. To transmit a signal to the control module 62, the HTTP server module 66 has the HTTP input line 208 and the HTTP output line 210.

The DHCP module 68 is a software module having a function of assigning the local IP address to the terminal 26. To transmit a signal to the control module 62, the DHCP module 68 has the DHCP input line 212 and the DHCP output line 214.

The control module 62 has a dialup function and a function based on PPP protocol and is a hardware and software module for controlling the EV-DO terminal module 50, the information exchange terminal module 52, the W-LAN terminal module 54, the NAPT module 64, the HTTP server module 66, and the DHCP module 68. The master communication apparatus and the slave communication apparatus described above differ in the function of the control module 62.

Figure 3:
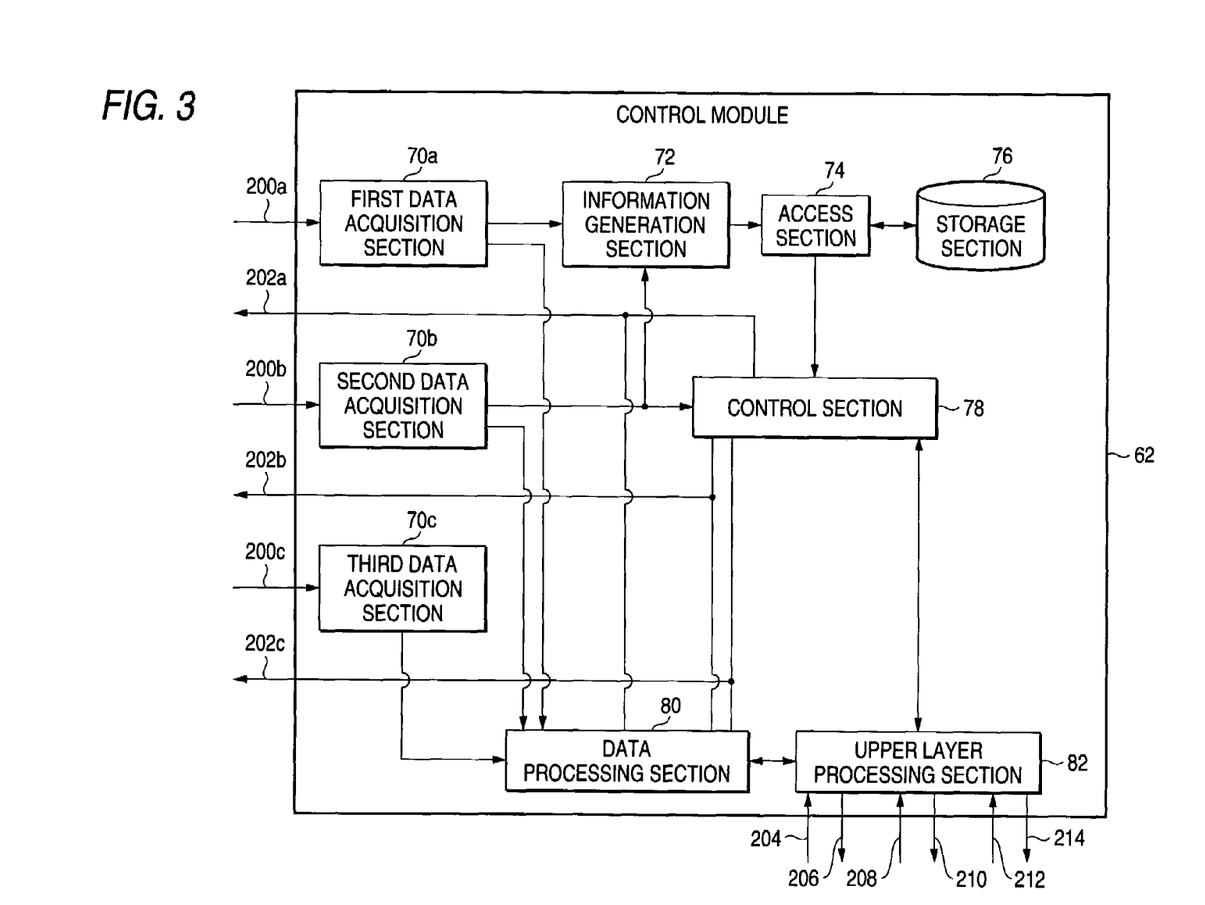
FIG. 3 is a block diagram to show the configuration of a control module.

FIG. 3 shows the configuration of the control module 62. The control module 62 includes a first data acquisition section 70a, a second data acquisition section 70b, and a third data acquisition section 70c collectively called data acquisition section 70, an information generation section 72, an access section 74, a storage section 76, a control section 78, a data processing section 80, and an upper layer processing section 82.

The data acquisition section 70 changes the output destination in response to the contents of data input from the module output line 200. The first data acquisition section 70a outputs data to the information generation section 72 or the data processing section 80. The second data acquisition section 70b outputs data to the information generation section 72, the control section 78, or the data processing section 80. The third data acquisition section 70c outputs data to the data processing section 80.

The information generation section 72 generates EV-DO information based on the data input from the first data acquisition section 70a. The EV-DO information includes information indicating whether or not communications with an EV-DO base station are being conducted at present, the ID, the PN number, and the SINR value of the currently communicating EV-DO base station, and the ID, the PN number, and the SINR value of a communicatable EV-DO base station. The master communication apparatus acquires the EV-DO information from the slave communication apparatus through the second data acquisition section 70b. The master communication apparatus creates an EV-DO information table from the generated EV-DO information and the acquired EV-DO information and records the created EV-DO information table in the storage section 76 through the access section 74. On the other hand, the slave communication apparatus records the generated EV-DO information in the storage section 76 through the access section 74.

Figure 4:
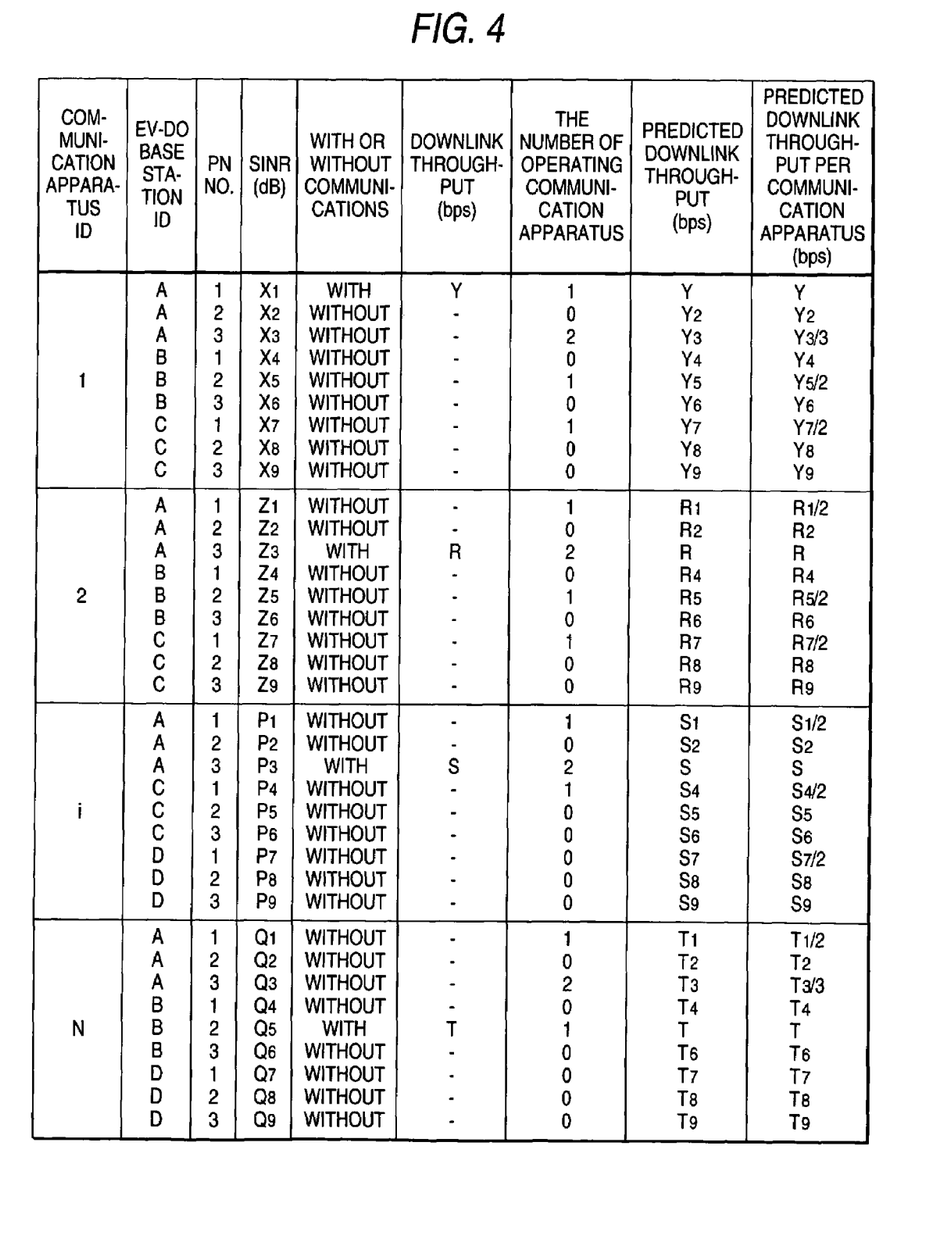
FIG. 4 is a drawing to show the data structure of an EV-DO information table.

The storage section 76 stores the EV-DO information and the EV-DO information table. FIG. 4 shows the data structure of the EV-DO information table. "Communication apparatus ID" shown in FIG. 4 indicates the ID number previously given to the communication apparatus 18. "Predicted downlink throughput" is downlink throughput predicted based on the SINR value, etc. Further, "predicted downlink throughput per communication apparatus" is found by dividing the predicted downlink throughput by the number of terminals communicating with the EV-DO base station of a predetermined ID and PN number. Since the number of other communication apparatus 18 connected to the base station to communicate with is reflected on the "predicted downlink throughput per communication apparatus," the "predicted downlink throughput per communication apparatus" becomes an effective parameter for smoothing the number of the communication apparatus 18 connected to the base station.

Figure 5:
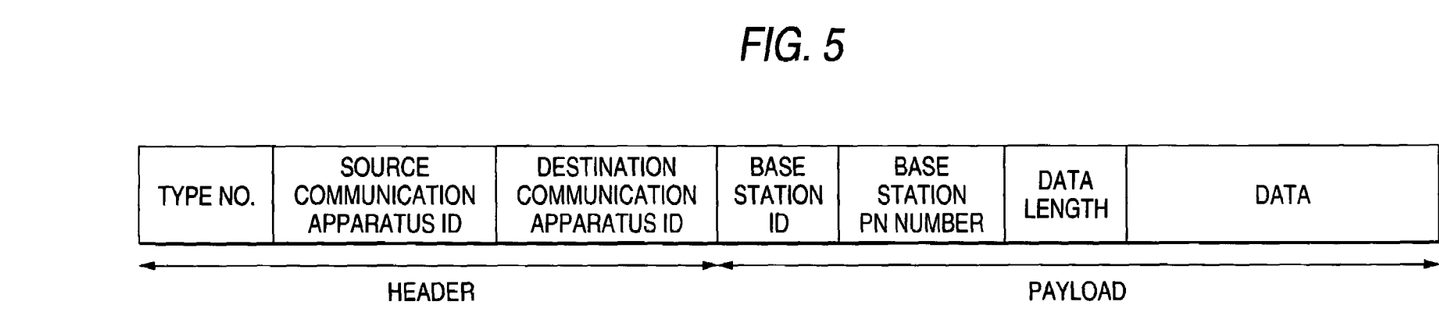
FIG. 5 is a drawing to show a burst format for information exchange.
Figure 6:
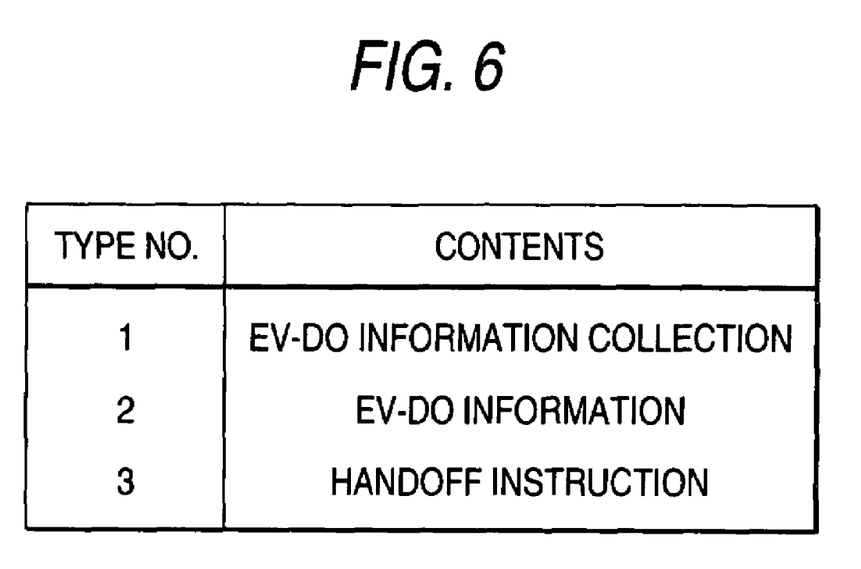
FIG. 6 is a drawing to show the description of an identification number.

If the communication apparatus is the master communication apparatus, the control section 78 determines the base station to which the master communication apparatus and the slave communication apparatus should connect based on the EV-DO information table stored in the storage section 76. Further, the control section 78 instructs the slave communication apparatus to hand off to the determined base station. The base station determination method is described later in detail. The control section 78 generates information exchanged through the second data acquisition section 70b between the master communication apparatus and the slave communication apparatus. FIG. 5 shows the burst format for information exchange. The identification number type of areas shown in FIG. 5 is shown in FIG. 6.

When the master communication apparatus requests the slave communication apparatus to send EV-DO information, the control section 78 sets "1" of an EV-DO information collection command in "type No." shown in FIG. 5. The control section 78 sets "ID of master communication apparatus" in "source communication apparatus ID," sets "0" meaning broadcast in "destination communication apparatus ID," and sets "0" in "base station ID" and "base station PN number."

Upon reception of the EV-DO information collection command from the master communication apparatus, the slave communication apparatus returns EV-DO information to the master communication apparatus. In this case, the control section 78 sets "2" of the EV-DO information command in "type No." The control section 78 sets "communication apparatus ID of each slave communication apparatus" in "source communication apparatus ID," sets "ID of master communication apparatus" in "destination communication apparatus ID," and sets "0" in "base station ID" and "base station PN number." "EV-DO information" is entered in a field of data.

When the master communication apparatus instructs the slave communication apparatus to hand off, the control section 78 sets "3" of a handoff instruction in "type No." The control section 78 sets "ID of master communication apparatus" in "source communication apparatus ID," sets "ID of slave communication apparatus" to which the handoff instruction is given in "destination communication apparatus ID," and sets "base station ID of handoff specification" and "base station PN number of handoff specification" in "base station ID" and "base station PN number" respectively.

Referring again to FIG. 3, the data processing section 80 transmits and receives data to and from the EV-DO terminal module 50, the information exchange terminal module 52, and the W-LAN terminal module 54. For example, the data processing section 80 outputs the data input from the first data acquisition section 70a to the third module input line 202c. The data processing section 80 accepts an instruction from the upper layer for transmitting and receiving data in the upper layer processing section 82 and outputs data transferred to the upper layer to the upper layer processing section 82.

This configuration can be implemented by a CPU, memory, and other LSIs of any computer as hardware and by a program having a reservation management function loaded into memory as software. FIG. 3 draws functional blocks implemented as they operate in conjunction with each other. Therefore, it is understood by those skilled in the art that the functional blocks can be implemented in various forms by hardware only, software only, or using them in combination.

Figure 7:
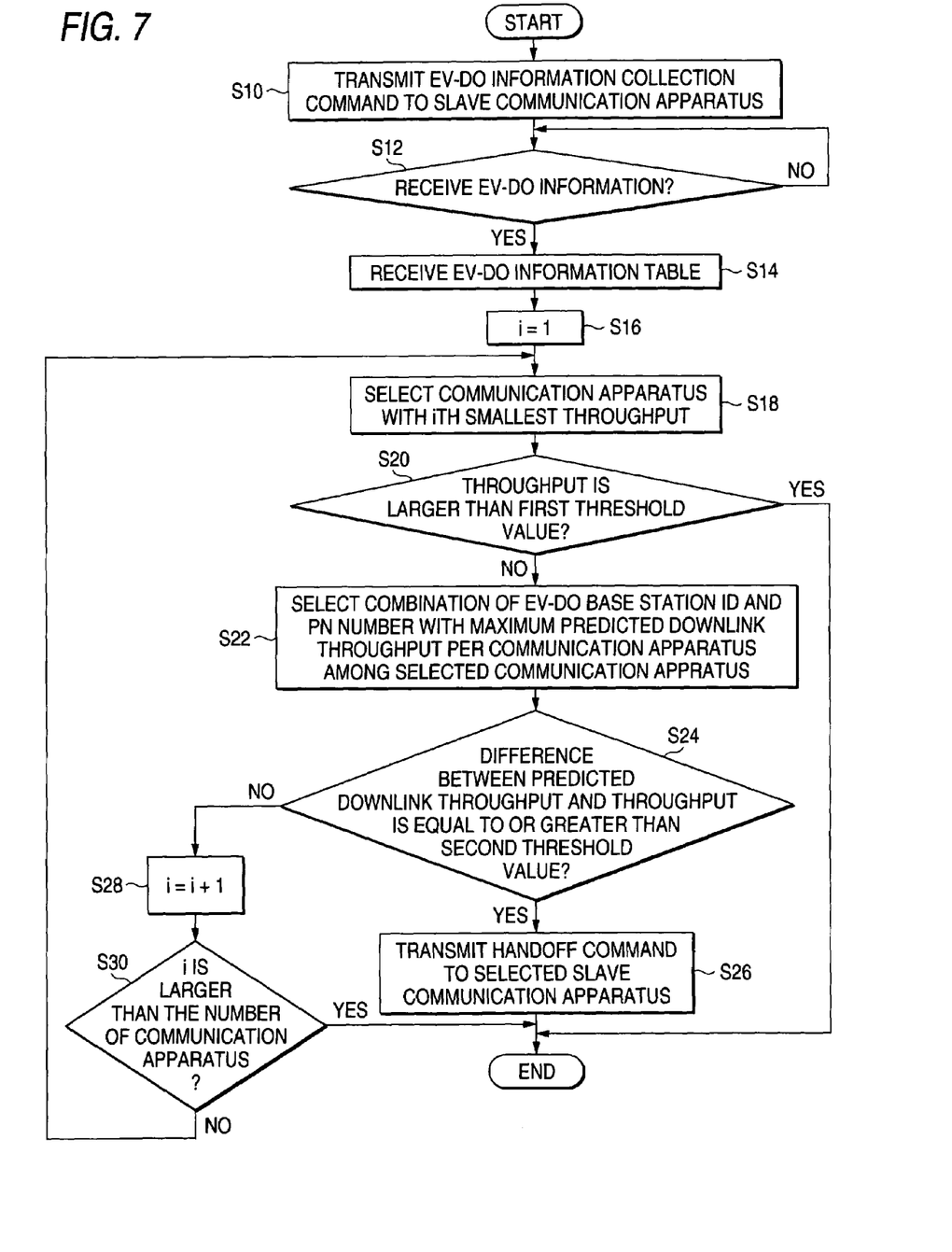
FIG. 7 is a flowchart to show a base station selection procedure of a master communication apparatus of the embodiment.

FIG. 7 is a flowchart to show a base station selection procedure of the master communication apparatus. The control section 78 transmits an EV-DO information collection command to the slave communication apparatus through the second module input line 202*b* (S10). The burst format for transmitting the EV-DO information collection command is as shown in FIG. 5. The master communication apparatus transmits such a burst at predetermined time intervals. In the description that follows, the operation in the case where one EV-DO information collection command is transmitted will be discussed. If the information generation section 72 receives EV-DO information through the second data acquisition section 70*b* (Y at S12), the information generation section 72 generates the EV-DO information table shown in FIG. 4 (S14).

The generated EV-DO information table is recorded in the storage section 76. If the information generation section 72 does not receive EV-DO information (N at S12), the control section 78 waits until EV-DO information is received. The burst format for transmitting the EV-DO information collection command is as shown in FIG. 5. The control section 78 sets a counter i with the number of the communication apparatus 18 as the maximum value to 1 (S16). The control section 78 selects the communication apparatus with the ith lowest "predicted downlink throughput per communication apparatus" at present in combination units of the ID and the PN number of the currently communicating EV-DO base station based on the EV-DO information table (S18). Here, "predicted downlink throughput per communication apparatus" is throughput Y [bps].

If the throughput Y is larger than a first threshold value (Y at S20), the throughput is already sufficient and therefore it is determined that the connected EV-DO base station is optimized. Then, the processing is terminated. If the throughput Y is not larger than the threshold value (N at S20), a search is made for the combination of the EV-DO base station and the PN number with the maximum throughput Y (which will be hereinafter referred to as "handoff candidate") among the selected communication apparatus (S22). Here, the throughput Y of the handoff candidate is throughput Y1 [bps]. If the difference between the throughput Y1 and the throughput Y is equal to or greater than a second threshold value (Y at S24), the control section 78 determines handoff to the base station of the handoff candidate and transmits a handoff command to the slave communication apparatus (S26). The burst format for transmitting the handoff command is as shown in FIG. 5. On the other hand, if the difference between the throughput Y1 and the throughput Y is less than the second threshold value (N at S24), the control section 78 adds one to the counter i (S28) and executes the above-described steps S18 to S28 until the counter i becomes larger than the number of the communication apparatus, namely, the maximum value (S30).

If the control section 78 finds a communication apparatus not communicating with the EV-DO base station at present and still being captured based on the EV-DO information table, when the communication apparatus is about to start communications with the EV-DO base station, the communication apparatus is placed out of the optimization processing targets of the EV-DO transmission rate.

Figure 8:
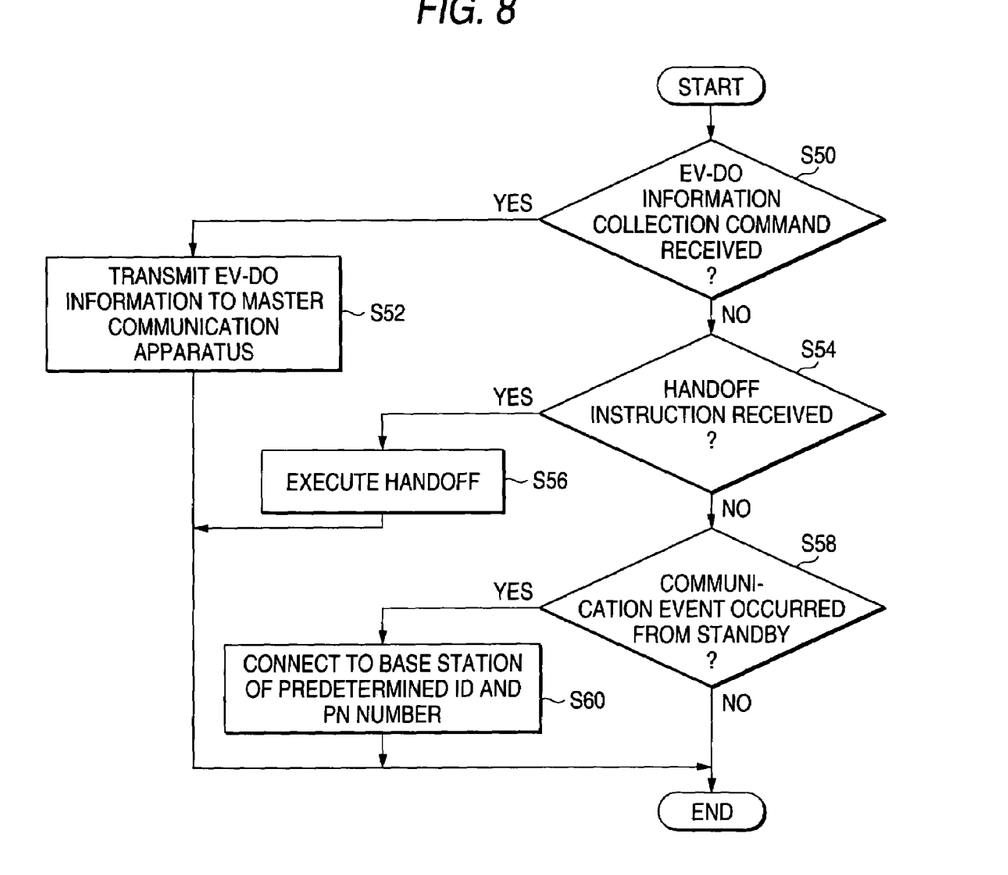
FIG. 8 is a flowchart to show a base station selection procedure of a slave communication apparatus of the embodiment.

FIG. 8 is a flowchart to show a base station selection procedure of the slave communication apparatus. If the control section 78 receives an EV-DO information collection command through the second data acquisition section 70*b* (Y at S50), the control section 78 transmits the EV-DO information stored in the storage section 76 to the master communication apparatus (S52). If the control section 78 does not receive an EV-DO information collection command through the second data acquisition section 70*b* (N at S50) and receives a handoff instruction (Y at S54), the control section 78 causes the EV-DO terminal module 50 to execute handoff (S56). If the control section 78 does not receive a handoff instruction through the second data acquisition section 70*b* (N at S54) and a communication event occurs in a standby state (Y at S58), connection is made to the base station of a predetermined ID and PN number (S60).

The operation of the described communication system 100 is as follows: The control section 78 of the master communication apparatus transmits an EV-DO information collection command to the slave communication apparatus. The information generation section 72 of the slave communication apparatus generates EV-DO information and records the EV-DO information in the storage section 76. Upon reception of the EV-DO information collection command, the information generation section 72 transmits the EV-DO information to the master communication apparatus. The information generation section 72 of the master communication apparatus generates EV-DO information and also receives the EV-DO information from the slave communication apparatus and creates an EV-DO information table based on the EV-DO information. The control section 78 of the master communication apparatus determines handoff from the currently connected base station to the slave communication apparatus to another base station so as to increase the transmission rate based on the created EV-DO information table. The control section 78 of the master communication apparatus transmits a handoff command to the slave communication apparatus. The control section 78 of the slave communication apparatus causes the EV-DO terminal module 50 to execute handoff in accordance with the handoff command.

In the embodiment, handoff of the base station is determined so that the transmission rate of each communication apparatus becomes high, so that the transmission rate can be improved. Since the throughput considering the effect of any other communication apparatus is controlled as the parameter, the base station to which a plurality of communication apparatus should connect can be distributed among the base stations and the transmission band share of one base station can be decreased, so that the transmission rate can be improved. Since the master communication apparatus, one of the communication apparatus, determines the base station to which each slave communication apparatus connects, the processing amount of the slave communication apparatus can be decreased.

It is to be understood by those skilled in the art that the embodiment is illustrative and that various modifications can be made in the combination of the components and the processes and such modifications are also involved in the scope of the invention.

In the embodiment, the EV-DO is adopted as the communication system between the first base station 10 and the communication apparatus 18 and the W-LAN is adopted as the communication system between the communication apparatus 18 and the terminal 26. However, the invention is not limited to them; a different communication system, for example, Personal Handyphone System may be adopted, for example, as the communication system between the first base station 10 and the communication apparatus 18. Further, different communication systems are adopted as the communication system between the first base station 10 and the communication apparatus 18 and the communication system between the communication apparatus 18 and the terminal 26, but the same communication system may be adopted. According to the modification, the invention can be applied to various communication systems. That is, the communication system between the first base station 10 and the communication apparatus 18 may be any if it enables communications with the communication apparatus 18 installed inside the vehicle 30 from the first base station 10 installed outside the vehicle 30.

In the embodiment, one of the communication apparatus 18 is set to the master communication apparatus. However, the invention is not limited to it; for example, one master communication apparatus and four slave communication apparatus may be installed in the vehicles of the first vehicle 30*a* to the fifth vehicle 30*e* for executing the processing of the embodiment and one master communication apparatus and four slave communication apparatus may be installed in the vehicles of the sixth vehicle 30*f* to the tenth vehicle 30*j* for executing the processing of the embodiment aside from the vehicles of the first vehicle 30*a* to the fifth vehicle 30*e*.

What is claimed is:

1. A communication apparatus controller comprising:

a connection section that directly connects with at least one communication apparatus which realizes indirect communications between at least one terminal and a base station;

an information acquisition section that acquires, from the at least one communication apparatus via the connection section, information concerning a plurality of base stations to which the communication apparatus is communicating or can communicate;

a determination section that determines whether the at least one communication apparatus should execute handoff and a base station to which the at least one communication apparatus should execute the handoff based on the information concerning the plurality of base stations to which the communication apparatus is communicating or can communicate acquired by the information acquisition section; and an instruction section that instructs the communication apparatus which should execute the handoff via the connection section to execute the handoff to the base station determined by the determination section, wherein the communication apparatus controller is coupled with the at least one communication apparatus such that the controller operates independently of the plurality of base stations.

2. A communication system comprising:

a master communication apparatus operable to realize indirect communications between at least one terminal and a base station;

at least one slave communication apparatus which is also operable to realize indirect communications between the at least one terminal and the base station; and a connection section which directly connects the master communication apparatus and the slave communication apparatus, the slave communication generating information concerning a plurality of base stations to which the slave communication apparatus can connect, and outputting the generated information to the connection section, wherein the master communication apparatus determines a slave communication apparatus which should execute the handoff and one of the plurality of base stations to which the slave communication apparatus should execute the handoff based on the information concerning the plurality of base stations to which the slave communication apparatus can connect received from the at least one slave communication apparatus via the connection section, and the slave communication apparatus executes handoff to the base station determined by the master communication apparatus, Wherein the communication apparatus controller is coupled with the at least one communication apparatus such that the controller operates independently of the base stations.

* * * * *